United States Patent Office 2,783,261
Patented Feb. 26, 1957

2,783,261
POLYOXYGENATED CYCLIC COMPOUNDS

Lloyd H. Conover, Oakdale, Conn., assignor to Chas. Pfizer & Co., Inc., New York, N. Y., a corporation of Delaware No Drawing. Application March 4, 1953,
Serial No. 340,411

12 Claims. (Cl. 260—438)

This invention is concerned with a process for the preparation of certain polyoxygenated cyclic compounds and with the new compounds prepared by these methods.

In the past a variety of hydroxy acids, polyols, poly ketones, hydroxy ketones or polyhydroxy ketones have been suggested as chelating agents or complexing agents for polyvalent metallic ions. However, there is need for materials of this nature with improved properties, particularly of compounds having appreciable organic solvent solubility when in the form of metallic complexes.

It has now been found that a new group of compounds which are 2-acyl-8-oxygenated tetralones are particularly effective as chelating, complexing or sequestering agents. By "oxygenated" is meant an hydroxyl group or a group hydrolyzable to an hydroxyl group, such as an ether or an ester group. The types of groups which may be used are more fully defined below. The complexes formed with polyvalent metallic ions are particularly stable and usually quite soluble in various organic solvents. This, of course, makes them useful for a variety of purposes such as in biological experimentation where the removal of traces of polyvalent metallic ions may be of great importance. They are also useful in analyses for polyvalent metallic ions which may be complexed and extracted by means of these reagents. Other uses common to sequestering agents are also apparent for these compounds.

More specifically, the new products of this invention may be represented by the following structural formula:

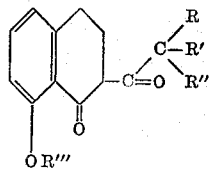

wherein R is an alkyl group having up to about six carbon atoms, an ethylene group (—CH₂CH₂—) attached to the 3-position of the saturated ring and to the carbon in question e. g.

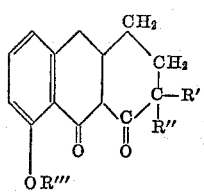

or R is a hydrogen; R' is hydrogen or an alkyl group having up to about six carbon atoms in its principal chain and R'' is hydrogen, an alkyl having up to six carbon atoms or an hydroxyl or a group readily hydrolyzable or reducible to an hydroxyl such as an ester or an ether group. An alkylene group or a substituted alkylene may take the place of the two groups R and R' e. g.

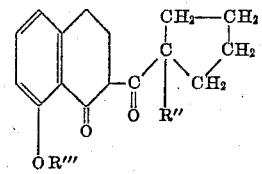

R''' is hydrogen, an alkyl, aralkyl or substituted alkyl group or an acyl group.

The group at the 8-position of the ring system may be present as an hydroxyl, an ether or ester group. The use of an ether or ester is sometimes of value in obtaining high yields during the preparation of the substituted tetralones. Especially useful ethers are benzyl, methoxymethyl, methyl and ethyl ethers. Benzyl ethers are particularly easily reduced to hydroxyl groups. Esters which may be used include the acetate, benzoate, succinate, phthalate, etc. The presence of an oxygen function, particularly an hydroxyl adjacent to the keto group in the acyl side chain makes the novel compounds even more effective as chelating agents.

The new compounds of this invention may be prepared by the acylation of 8-hydroxytetralones with an ester in the presence of a strongly alkaline condensing agent or with an acid anhydride in the presence of boron trifluoride. The tetralone may be substituted in various ways. The aromatic ring of the tetralone may be substituted with one or more halogen atoms in addition to the 8-hydroxyl or substituted hydroxyl, for instance, at the 7 and/or 5 positions of the ring. Alternatively or in addition to the halogens the 4-position of the tetralone may be substituted with an hydroxyl group and a methyl group. Compounds of this nature are obtained by the selective action of a methylating compound, such as a methyl Grignard reagent on a suitable 8-hydroxy-dihydronaphthoquinone. The acylation reaction with a compound of this type may be conducted as indicated in the following equation:

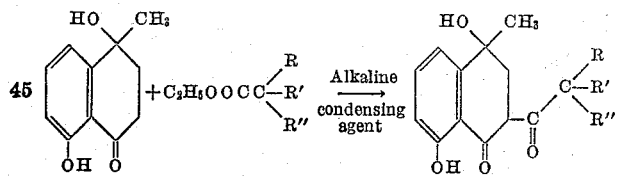

The aromatic ring of the 4,8-dihydroxy-4-methyltetralone may, of course, be substituted with other groups such as halogen atoms. Acylation may be accomplished by means of an ester of a cycloalkane carboxylic acid. Of particular value are the cyclohexane and cyclohexene carboxylic acid compounds and the cyclohexanone carboxylic acid compounds. The tetralones used for this acylation may, of course, be substituted in the 4-position of the hydroaromatic ring with a methyl and an hydroxyl. When acylation is conducted by means of one of these compounds, there is obtained a cycloalkane 8-hydroxytetralone ketone. For instance, if a cyclohexane carboxylic acid ester is used as the acylating agent then the compound formed will have the structure

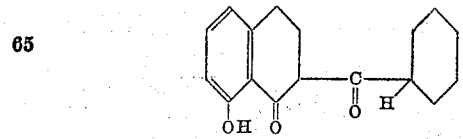

The cycloalkane ring may bear various substituents such as carboxylic acid or substituted carboxylic acid groups, etc. The aromatic ring of the tetralone moiety may bear one or more halogens, and the saturated ring of this moiety may bear a methyl and hydroxyl at the 4-position.

Acylation at the 2-position of the tetralones may also be conducted by intramolecular condensation of an ester of 8-hydroxytetralone 3-($\gamma$-butyric acid). This reaction may be depicted by the following structural formulas:

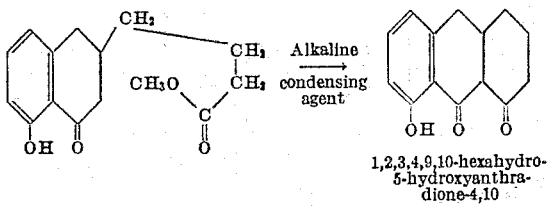

1,2,3,4,9,10-hexahydro-5-hydroxyanthradione-4,10

In these compounds the aromatic ring may be substituted by one or more halogens or by other substituents. Furthermore, the tetralone may be substituted by methyl and an hydroxyl at the 4-position and the position adjacent to the carboxyl group of the butyric acid side chain may be substituted with R' and R" groups as defined above.

The acylation reaction is conducted in anhydrous medium using a strongly alkaline condensing agent such as sodium metal, sodium alkoxide or sodamide. It has been found that the use of an ester of the desired acyl group is particularly useful in this condensation. Rather than using an inert solvent such as an aromatic hydrocarbon or an ether, an excess of the ester acylating agent may be used as the solvent. If phenyl acetate is used as the acylating agent, an acetyl group is introduced at the 2-position of the tetralone nucleus. Other esters or acylating compounds may be used in place of the phenyl esters, as previously described. Finally, if an ether of the 8-hydroxyl group has been used for the condensation, this may be removed so that the product may have maximum activity. If a benzyl ether is used, it may be readily removed by selective hydrogenation without reducing the keto groups in the saturated ring of the tetralone and in the acyl side chain at the 2-position.

An alternative method of acylation is the use of an acid anhydride; for instance, acetic anhydride and boron trifluoride as a condensing agent. It may be conducted by dissolving the 8-oxygenated tetralone in the desired acid anhydride and saturating the mixture with boron trifluoride. The product may then be isolated in a conventional manner. However, this method is definitely limited by the difficulty of obtaining acid anhydrides for the desired acylating agents as contrasted with the ease of obtaining esters of the proper carboxylic acid.

The polyvalent metallic salt complexes of the acylated tetralones of this invention are readily prepared by contacting the tetralone with the metallic salt in a suitable solvent. The complexes may be formed in aqueous media. Organic solvents such as lower alcohols are also very useful.

The following examples are given by way of illustration and are not to be considered as the only manner in which this invention may be embodied. It is to be understood that protection hereof is only to be limited by the specific wording of the appended claims.

EXAMPLE I

*Preparation of 2-acetyl-8-hydroxytetralone*

A mixture of 13 grams of 8-hydroxytetralone, 35 millimeters of ethyl acetate and 4.2 grams of finely divided sodium was placed in a round-bottomed flask and the mixture was heated under reflux for five hours. During heating, the mixture was protected from moisture and carbon dioxide of the air. The reaction mixture was then poured into a mixture of ice and 5% aqueous acetic acid in sufficient quantity so that the reaction was acid when all of the mixture had been quenched. The product was extracted from the mixture with ether. The ether was washed with dilute aqueous sodium bicarbonate, dried and evaporated. The residual material was then treated with a saturated solution of copper acetate in methanol. The crystalline copper chelate of 2-acetyl-8-hydroxytetralone separated. This product was filtered and dried. It weighed 7.8 grams. The chelate was soluble in dioxane, chloroform and other lower halogenated hydrocarbons. A sample of the material was converted to 2-acetyl-8-hydroxytetralone by treatment with a mixture of dilute sulfuric acid and ether. The ether layer was separated, washed with water and dried and the ether was removed under vacuum. The residual liquid was distilled to obtain purified 2-acetyl-8-hydroxytetralone. This compound is effective in completely inhibiting the growth of *K. pneumoniae* microorganisms at a concentration of 1 milligram per milliliter of solution. The tetralone when dissolved in 0.01 molar methanolic hydrochloric acid displays ultraviolet absorption peaks at 229, 271 and 352 m$\mu$. When dissolved in methanol, which is 0.01 molar in sodium hydroxide, a peak occurs at 364 m$\mu$ in the ultraviolet and a shoulder in the curve occurs at 260m$\mu$. When dissolved in methanol which is 0.01 molar in nickel chloride hexahydrate, the ultraviolet absorption displays maxima at 260 and 366 m$\mu$. The shift in the ultraviolet absorption spectrum in the presence of nickel chloride in methanol is attributed to the formation of the nickel chelate of the 2-acetyl-8-hydroxytetralone.

EXAMPLE II

*Preparation of the copper chelate of 2-acetyl-8-hydroxytetralone*

A solution of 2-acetyl-8-hydroxytetralone in methanol was treated with a solution of copper acetate in methanol. Within a short time, crystalline copper chelate separated from solution. This product was filtered, washed with a small volume of methanol and dried. It was then recrystallized from benzene. The product melted at 254–255° C. with decomposition. Analysis showed the product to contain two molecules of the tetralone per atom of copper.

*Analysis*: Calcd. for: $C_{24}H_{22}O_6Cu$: C, 61.33; H, 4.72; Cu, 13.53. Found: C, 61.35; H, 4.83; Cu, 13.43.

EXAMPLE III

*Preparation of 2-acetyl-8-benzyloxytetralone*

This product was prepared by the procedure given in Example I but using 8-benzyloxytetralone and phenyl acetate as the reactants. After completion of the reaction, the mixture was poured into ice and acetic acid. The product was extracted with ether and the ether solution was washed with dilute sodium bicarbonate solution before it was dried and evaporated. The product was obtained as a viscous pale yellow oil. This material displayed ultraviolet maxima when dissolved in 0.01 molar methanolic hydrochloric acid at 260 and 343 m$\mu$. When the product was dissolved in 0.01 molar methanolic sodium hydroxide, ultraviolet maxima at 257 and 355 m$\mu$ were observed. The product may be purified through formation of a copper complex which separates as a solid from lower alcohols such as methanol. The copper complex forms somewhat more slowly than is the case with the 8-hydroxy compound. The copper complex may be converted to the 2-acetyl-8-benzyloxytetralone by treatment with dilute aqueous acid and extraction into a solvent such as ether. Separation of the solvent solution and evaporation yields the tetralone.

EXAMPLE IV

*Preparation of 2-propionyl-4-hydroxy-8-methoxy-4-methyltetralone*

4-hydroxy-8-methoxy-4-methyltetralone was condensed under conditions similar to those used in Example I with phenyl propionate with the use of finely divided metallic sodium. After stirring the reaction mixture for several hours, it was poured into a mixture of ice and water containing sufficient acetic acid to yield a slightly acid mixture. The product was isolated by extraction and distillation of the solvent. It was found that the residual material formed chelates with polyvalent metals such as copper.

EXAMPLE V

*Preparation of 2-cyclohexanecarbonyl-8-ethoxytetralone*

8-ethoxytetralone was condensed under conditions comparable to those used in Example I above with an excess over the molecular proportion of ethyl cyclohexanecarboxylate. The condensation was conducted by means of finely divided metallic sodium. The product was isolated and purified. It was found to form chelates with polyvalent metallic ions.

What is claimed is:

1. A process for the preparation of a 2-carboxyacyl-8-oxygenated tetralone which comprises contacting a tetralone, having at the 8-position a substituent selected from the class consisting of hydroxyl ester and ether groups under anhydrous conditions with an ester in the presence of an alkaline condensing agent.

2. A process as claimed in claim 1 wherein the tetralone is substituted at the 4-position with a methyl group and an hydroxyl group.

3. A process as claimed in claim 1 wherein the aryl ring of the tetralone is halogenated.

4. A process as claimed in claim 1 wherein the acylating agent is a cycloalkane carboxylic acid ester.

5. A process as claimed in claim 1 wherein the tertalone is substituted at the 3-position with a γ-butyric acid ester group.

6. A process for the preparation of 2-acetyl-8-hydroxytetralone which comprises condensing ethyl acetate with 8-hydroxytetralone in the presence of sodium metal.

7. A 2-carboxyacylated tetralone, having at the 8-position a substituent selected from the class consisting of hydroxyl ester and ether groups.

8. A 2 - carboxyacylated-4-hydroxy-4-methyltetralone, having at the 8-position a substitutent selected from the class consisting of hydroxyl, ester and ether groups.

9. A 2-carboxyacylated tetralone substituted in the aromatic ring with halogen and having at the 8-position a substituent selected from the class consisting of hydroxyl, ester and ether groups.

10. A 2-cycloalkanoyltetralone, having at the 8-position a substituent selected from the class consisting of hydroxyl, ester and ether groups.

11. 2-acetyl-8-hydroxytetralone.

12. A polyvalent metallic complex of the product claimed in claim 7.

References Cited in the file of this patent

UNITED STATES PATENTS 2,651,634     Henecka _____ Sept. 8, 1953

OTHER REFERENCES

Elsevier's Encyclopedia of Org. Chem., vol. 12B, pp. 2712–2713.

Cocker et al.: Jour. Chem. Soc. (1950), pp. 1519–20 (or Chem. Abstr., vol. 45, p. 1084).